(12) United States Patent
Knapp

(10) Patent No.: US 6,708,895 B1
(45) Date of Patent: Mar. 23, 2004

(54) FLOW RATE REGULATOR TO REDUCE VARIATION IN TEMPERATURE OF WATER DRAWN FROM A MIXING DEVICE

(75) Inventor: Alfons Knapp, Biberach/Riss (DE)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 10/088,846

(22) PCT Filed: Jul. 29, 2000

(86) PCT No.: PCT/EP00/07352

§ 371 (c)(1),
(2), (4) Date: Mar. 21, 2002

(87) PCT Pub. No.: WO01/21986

PCT Pub. Date: Mar. 29, 2001

(30) Foreign Application Priority Data

Sep. 21, 1999 (IT) ..................................... TO99A0803

(51) Int. Cl.⁷ ............................................. G05D 23/13
(52) U.S. Cl. .................................. 236/12.1; 236/12.15
(58) Field of Search ........................ 236/12.1, 12.15, 236/12.2, 12.14; 137/605, 625.4, 625.41

(56) References Cited

U.S. PATENT DOCUMENTS

| | | | |
|---|---|---|---|
| 1,948,044 A | * 2/1934 | Myers et al. | 137/87.01 |
| 2,326,096 A | * 8/1943 | Dillman | 236/12.14 |
| 2,503,901 A | * 4/1950 | Chace | 68/12.19 |
| 2,560,293 A | * 7/1951 | Kempton | 236/12.2 |
| 2,565,290 A | * 8/1951 | Zak | 236/12.15 |
| 2,670,900 A | * 3/1954 | Branson | 236/12.15 |
| 2,772,833 A | * 12/1956 | Chace | 236/12.15 |
| 5,205,482 A | * 4/1993 | Ems | 236/12.1 |

FOREIGN PATENT DOCUMENTS

JP 59-155674 * 9/1984

* cited by examiner

Primary Examiner—William E. Tapolcai
(74) Attorney, Agent, or Firm—Kwadjo Adusei-Poku; Lloyd D. Doigan

(57) ABSTRACT

A new use of a flow rate regulating device (5, 6) is disclosed whose feature consists of the fact that, when inserted in a water pipeline, it permits the passage of a flow of water having a substantially constant flow rate and predetermined in keeping with the variation within certain limits of the pressure at which the water is supplied to the device, thus constituting a variable resistance that is opposed to the water flow. The new use is especially designed to perform the function of reducing the temperature peak presented by the mixed water drawn from a thermostatic mixing device (1) during the transitory period of regulation when the pressure of the water supplied to one of the inlets (2, 3) of the thermostatic mixing device (1) varies abruptly with respect to the pressure of the water supplied to the other inlet of the thermostatic mixing device (1). The new use consists of the insertion of the flow rate regulating device (5, 6) in the passage of at least one of the flows of supply of cold water and hot water (inlets 2, 3) directed to the thermostatic mixing device (1). The flow rate regulator (5, 6) can be inserted on the passage of both supply flows of cold and hot water, of the hot water supply flow only, or, and preferably, of the cold water supply flow only.

6 Claims, 2 Drawing Sheets

US 6,708,895 B1

FLOW RATE REGULATOR TO REDUCE VARIATION IN TEMPERATURE OF WATER DRAWN FROM A MIXING DEVICE

TECHNICAL FIELD

The present invention relates to a hydraulic installation which comprises a mixing device having an inlet connection for receiving a flow of supply of cold water, an inlet connection for receiving a flow of supply of hot water, and a delivery connection for delivering mixed water. In particular, this invention relates to a new use of a known device called "flow rate regulator" in connection with a mixing device to perform a function different from the functions for which this known device has been employed so far.

BACKGROUND OF THE DISCLOSURE

"Flow rate regulators" are currently commercially available and are known, for example, in a simple form from catalog 133/16/99 of the Dieter Wildfang GmbH of M üllheim (Germany), and in a form combined with a nonreturn valve from German Patent No. 196 03 393. The basic feature of this device consists in the fact that, when inserted in a water pipeline, it permits a flow of water with a substantially constant flow rate that is preset upon the variation—within certain although wide limits, for example, from 1 to 10 bar—of the pressure at which the water is supplied to the device. This device, therefore, represents a variable resistance to the flow, in other words, it opposes a resistance to the flow which, starting with a certain value of a given supply pressure, keeps diminishing strongly with the decrease of the water supply pressure. The substantially constant flow rate, which the flow rate regulator allows to pass, depends on the design features of the device.

The flow rate regulator is currently employed, in particular:

in order to make sufficiently constant the flow that runs through an instantaneously boiler, which would not work regularly if the flow running through it were not comprised between certain limits;
  to limit the flow rate drawn from a shower, as prescribed in certain regulations; and
  to limit the flow rate drawn from a faucet for the purpose of saving water.

The phenomenon with respect to which the invention proposes the employment of a flow rate regulator, in particular, involves the phenomenon of the temperature peak presented by the thermostatic mixing devices when there is a noteworthy and abrupt variation in the water supply pressure to one of the hot-and-cold water increments, a variation which, in most cases, involves an abrupt reduction of the cold water pressure because, from the water supply network, there is drawn a strong flow rate by an apparatus that entails high absorption such as a flowmeter flushing water device. The development of the phenomenon involved will be described with reference to this most frequent case.

When the pressure of the cold water supplied to a thermostatic mixing device diminishes abruptly, while the hot water supply pressure remains constant or almost constant, then the incoming cold water flow will diminish correspondingly, and, therefore, the temperature of the mixed water goes up abruptly. The temperature of the mixed water is detected by a thermometric element which, in the presence of a temperature increase, activates a regulating mechanism that provides for choking a passage for the hot water so as to return to the correct value imposed by the temperature of the mixed water. However, this regulating action involves a certain hysteresis due to the fact that regulation requires a certain period of time to be performed. During the period of transition in which takes place the regulating action as such, the temperature of the mixed water that is drawn presents an initial peak indicating a temperature rise, which can involve several degrees and which is then gradually attenuated until the prescribed temperature is once again reached. This temperature rise peak is extremely disturbing to the user, for example, during a shower, and it attains particularly high values, which can even turn out to be dangerous.

The same phenomenon could happen if, in a somewhat special case, there were to be an abrupt increase in the hot water supply pressure. Instead, a similar phenomenon, but with a temperature peak decline, occurs when it is the hot water supply pressure that drops abruptly or when the cold water supply pressure rises abruptly.

Similar phenomena not in the form of temperature peaks but in the form of variations in the temperature of the water that is drawn occur under similar conditions even in non-thermostatic mixing devices.

The inconveniences connected with this phenomenon can be partly remedied by installing in water supply pipelines up the line from the thermostatic mixing device a pressure compensator. However, this expensive additional device increases the size and complexity of the installation also because it must be connected to both of the cold water and hot water supply pipelines; that raises the cost of the equipment and of the operations involved in its installation; besides, this is a delicate operation; it is easily subject to failure, especially due to deposits, and it requires a certain amount of maintenance. By the way, it does not operate in an entirely satisfactory manner because, when the pressure is reduced in a pipeline, the compensator provides for the reduction of the passage offered to the other pipeline and thus corrects the mixing ratio but modifies the flow rate that is drawn. On the other hand, the operation of the pressure compensator can under certain conditions cause phenomena of instability.

As a matter of fact, the phenomenon described here is considerably toned down because, without using a pressure compensator proposed, for example, in Italian Patent Application No. TO 99 A 000 162, it involves introducing into one or both water supply connections of the thermostatic mixing device and particularly in the connection for the supply of cold water a choking member. This choking member has the effect of causing the regulating mechanism controlled by the thermometric element to be arranged normally in an asymmetrical position and, in particular, if the choking member is inserted in the cold water supply connection, it is arranged closer to the position in which the regulating mechanism actually chokes the passage of the hot water. Consequently, the regulating mechanism itself is more ready to react to a rise in the temperature of the mixed water and it is therefore capable of causing a more moderate temperature peak.

Further, document GB-A-2 303 685 discloses a mixer control comprising a mixing chamber at which thermostatically controlled valve means is provided for controlling mixture of hot and cold water for an adjustable discharged water temperature selectable by manual operation of the valve means, an outlet by way of which mixed water from the mixing chamber passes to be discharged from the mixer control, and a temperature responsive shut-off valve at the outlet which is normally open but which is operated automatically to close the outlet when the temperature of water from the mixing chamber exceeds a predetermined value which will normally be at or just above the maximum permitted operating temperature of the mixer control.

Although the shut-off valve according to this prior art provides a back-up for the thermostatically controlled valve means to cut-off water discharge should the valve means not respond, or not respond quickly enough, to an increase in the discharged water temperature to an undesirable level, a disadvantage of this prior art consists in the fact that the shut-off valve considerably adds to the structural complexity and cost of the known mixer control.

In addition, document GB-A-2 303 685 generally discloses that "flow regulators" may be included at the hot and cold inlets to optimise performance of the mixer control in high or uneven inlet water pressure conditions. The structure and the function of these "flow regulators" however are not described in more detail.

The object of the present invention is to provide a hydraulic installation in which undesirable temperature increases as described above are reduced or eliminated at low effort and cost.

SUMMARY OF THE DISCLOSURE

According to the present invention a hydraulic installation is provided which comprises a mixing device having an inlet connection for receiving a flow of supply of cold water, an inlet connection for receiving a flow of supply of hot water, and a delivery connection for delivering mixed water, and which further comprises a flow rate regulating device inserted in the passage of at least one of the flows of supply of cold water and hot water directed to the mixing device, wherein the flow rate regulating device is adapted to permit, within certain limits of the pressure at which the water is supplied to the flow rate regulating device, the passage of a flow of water having a predetermined and substantially constant flow rates, thus reducing the temperature peal presented by the mixed water drawn from the mixing device when the pressure of the water supplied to one of the inlet connections varies abruptly with respect to the pressure of the water supplied to the other inlet connection.

Research conducted by the inventor showed that extremely more satisfactory results are obtained if, in place of a standard choking member as disclosed in Italian Patent Application No. TO 99 A 000 162, constituting a resistance with an unchangeable value, one installs a flow rate regulating device at least in one water supply connection and preferably in the water supply connection for the cold water or possibly in both water supply connections.

The reason for the significant improvement in the performance of the thermostatic mixing device resides in the fact that, when the pressure in a water supply connection in which is installed a flow rate regulator drops abruptly, the resistance opposed to the flow of the flow rate regulator also drops immediately and, therefore, the initial variation of the temperature of the mixed water, which gives rise to the regulating action of the thermometric element, is for this reason alone much more reduced than what would be the case if the flow rate regulator were not installed. On the other hand, the flow rate regulator by itself constitutes a choking member and therefore offers the above-mentioned advantage of speeding up the regulating action when compared to what it would be if such a choking member were not there. The coexistence and the synergism of these two actions give rise to significant constant advantages. An important factor in this action is represented by the fact that the reaction of the flow rate regulator is extremely fast and practically instantaneous. It follows from this that a thermostatic mixing device which, in the absence of the proposed provision, would have given rise to a temperature rise peak of several degrees, instead leads to a significantly reduced temperature peak, for example, amounting to ½ a degree, which does not cause any inconvenience and may even pass unnoticed.

Naturally, the flow rate regulator installed in at least one water supply connection of the thermostatic mixing device can be of the type combined with a nonreturn value in all cases where the presence of such a valve is desirable.

These and other features, purposes and advantages of the object of this invention will appear more clearly in the following description of an embodiment, consisting in a nonrestrictive example with reference to the enclosed drawing.

BRIEF DESCRIPTION OF THE DRAWING

Reference now is made to the accompanying drawing in which.

DETAILED DESCRIPTION OF THE PREFERRED EMBODIMENT

Figure 1:
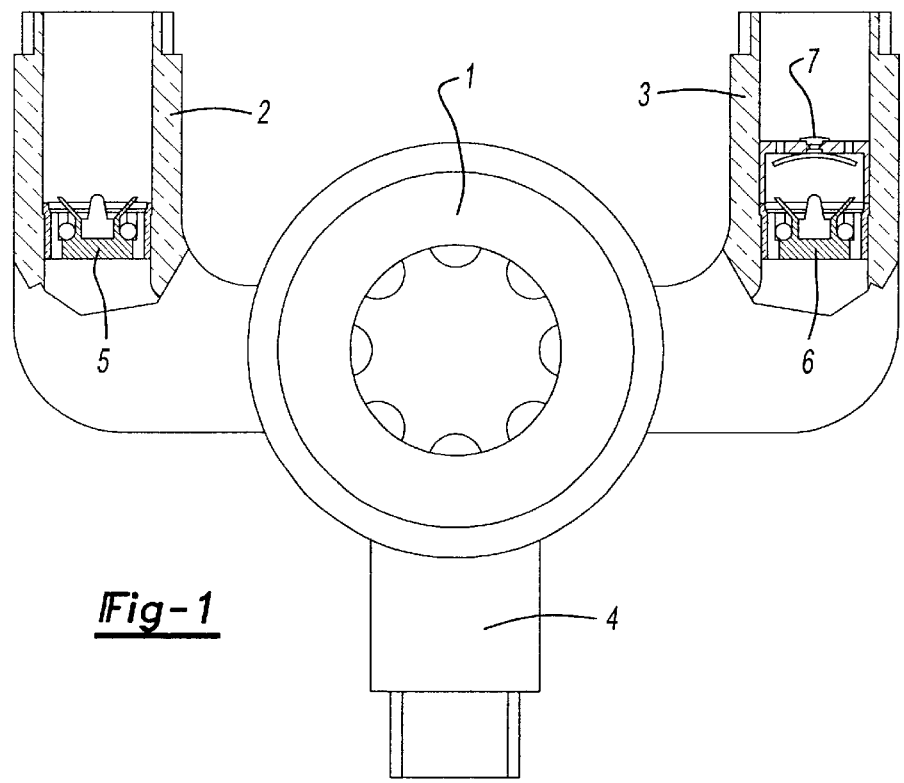
FIG. 1 illustrates a thermostatic mixing device in which one uses at least one flow rate regulator for the above-described functions.
Figure 2:
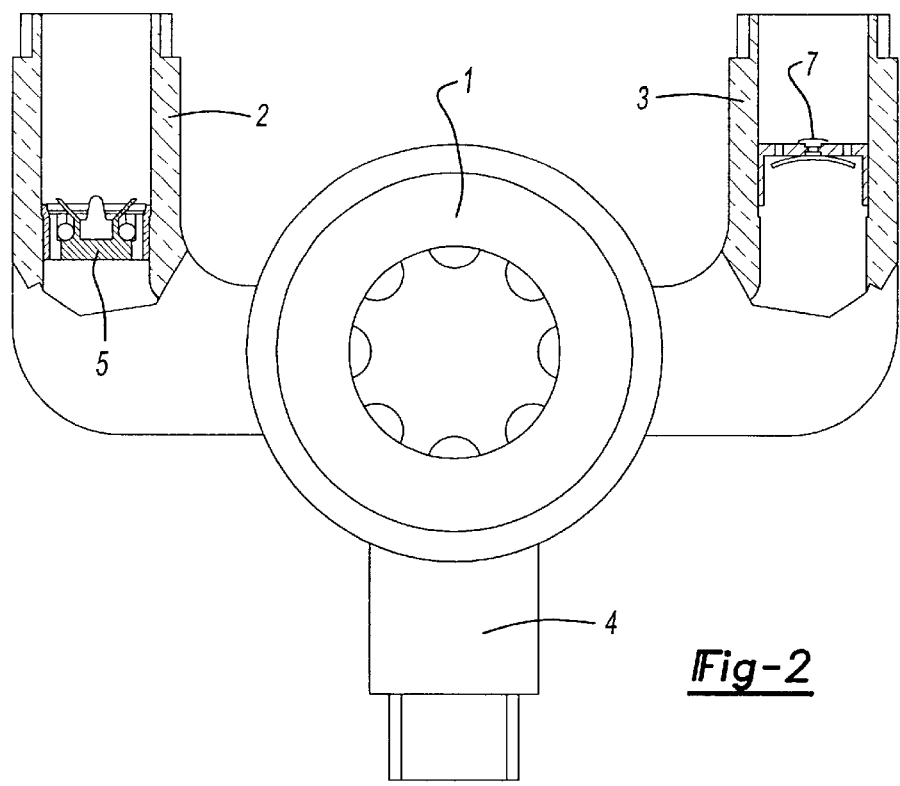
FIGS. 2 and 3 are variations of the thermostatic mixing device shown in FIG. 1.
Figure 3:
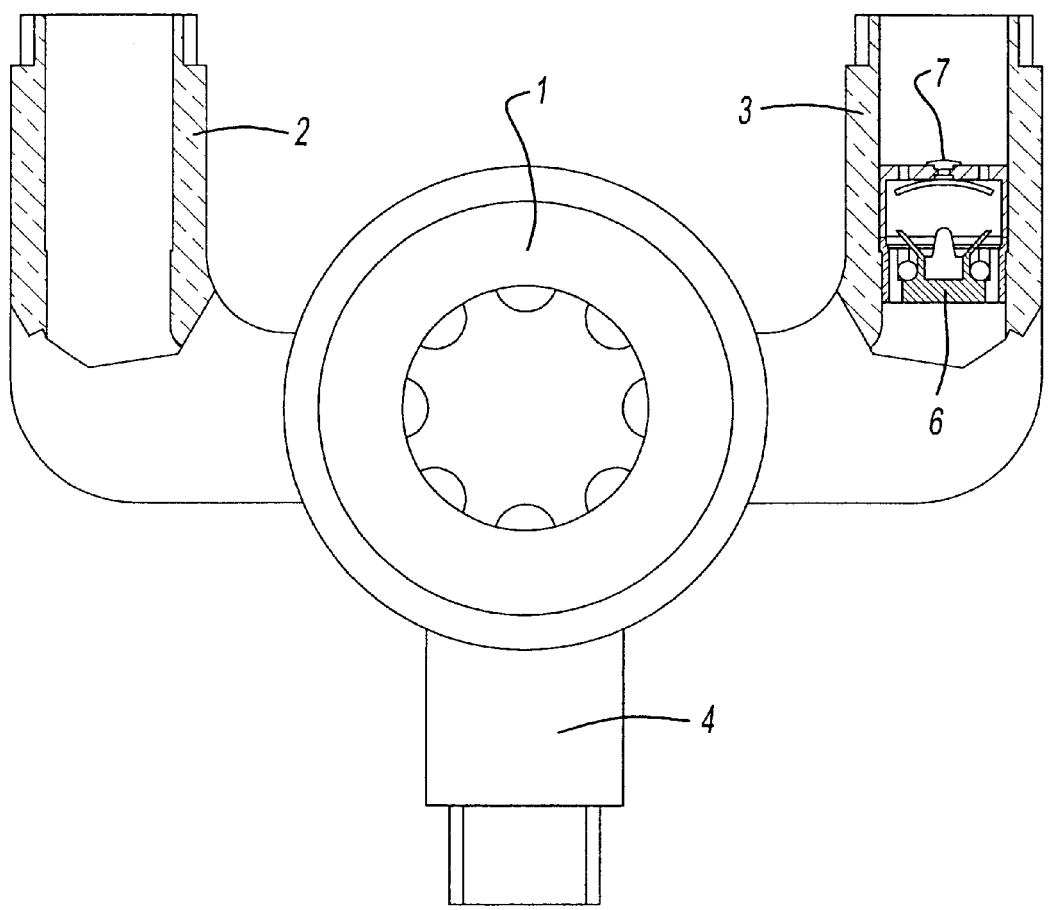

FIG. 1 presents an outside view of an example of the thermostatic mixing device comprising a body 1 with two inlet connections 2 and 3 and with a delivery connection 4. The internal structure of the thermostatic mixing device is not shown because it can be of any kind and is not involved in the application of the invention. Inlet connections 2 and 3 are shown in a partial cross-section to demonstrate how a flow rate regulator would be inserted by way of implementation of the invention.

With reference to connection 2, which is assumed to be the inlet connection for the cold water, it will be noted that there is inserted in it a flow rate regulator 5 of the simple type, devoid of any parts that work as nonreturn valve. It can be employed in all cases where it is not required to prevent an inverted flow as well as in cases where such prevention is required but is entrusted to separate means.

The performance of the thermostatic mixing device thus equipped is as was described in the introduction. The presence of a resistance to the entry of cold water, represented by the flow rate regulator, causes the regulating mechanism of the thermostatic mixing device (of whatever kind it may be) to be arranged normally in the asymmetrical position, closer to the position that reduces the intake of hot water than to the position that reduces the intake of cold water so that the thermostatic mixing device will react more rapidly to a trend toward an increase in the temperature of the water that is drawn rather than to a tendency toward a diminution of said temperature. On the other hand, in case there is a variation in the water supply pressure in the connection in which it is installed, the flow rate regulator modifies the resistance to the flow so as to bring about a great reduction in the influence deriving from the variation of the pressure upon the temperature of the mixed water. The combination of these two actions gives rise to the significant effect of minimizing the temperature peak, which was found as a result of this provision.

Flow rate regulator 5 is shown as installed directly in inlet connection 2 of the thermostatic mixing device because the latter is the installation that ensures the minimum size and because it is in many cases preferably, but naturally, the flow rate regulator could also be installed in an accessory to be applied between a water supply pipe and the intake connection of the thermostatic mixing device, or it could be installed in the water supply piping itself.

If there is a requirement for preventing an inverted flow, as was stated earlier, in place of a simple flow rate regulator, one can then install a flow rate regulator connected to a nonreturn means. This installation is represented in relation to the inlet connection 3 or the thermostatic mixing device in which is installed a flow rate regulator 6 which, in terms of design, is linked to a nonreturn means 7.

It is obvious that it may be sufficient and in many cases it may be preferable that a single flow rate regulator be installed in only one intake connection of the thermostatic mixing device and especially in the intake connection for the cold water. However, in other cases, it may preferable that both the intake connections of the thermostatic mixing device be equipped with a flow rate regulator and, in this case, both of them can be simple, both can be provided with nonreturn means or, as in the example shown, one of them can be simple and the other one can be provided with nonreturn means.

In case each of the intake connections of a thermostatic mixing device is provided with a flow rate regulator, it is particularly advantageous to employ two flow rate regulators, so arranged as to draw different flow rates and precisely to insert in the cold water inlet connection a flow rate regulator that is so arranged as to draw a flow rate that is less than the flow rate for whose delivery is arranged the flow rate regulator inserted in the hot water inlet connection. In this way, the greater resistance to the flow, created by the flow rate regulator inserted in the cold water inlet connection, conserves and enhances the advantageous effects in terms of giving rise to an asymmetrical position of the control mechanism that is activated by the thermometric element.

As will be noted, the known uses of a flow rate regulator do not in any way suggest the application of such a device to the inlet of a thermostatic mixing device nor would they hint at the supposition that said application could lead to a significant reduction of the temperature peak that is observed during the regulation transition period subsequent to an abrupt variation in the water supply pressure.

The use of a flow rate regulator, incorporated in an automatic valve intended for the different function of stabilizing the operation of a thermostatic mixing device, was provided in the Italian Patent Application TO 99 A 000 802 which goes back to the same inventor, contemporaneously with the Italian Patent Application TO 99 A 000 803, the priority of which is claimed. In effect, the reduction of the temperature peak, which is the object of this application, occurs also unforeseeably with the employment of an automatic valve such as the one that is the object of the first-mentioned Italian patent application. The insertion of a flow rate regulator in an automatic valve, according to said application, is therefore also an object of this invention for the purpose of bringing about a reduction in the temperature peak that occurs during the period of transition involved in the regulation action subsequent to an abrupt variation in the water supply pressure of a thermostatic mixing device.

Although the new use proposed by this invention relates especially to the preferred application in a thermostatic mixing device for the purpose of reducing its temperature peak during the regulation transition period, a noteworthy advantage can be secured by a corresponding application in a nonthermostatic mixing device. This, naturally, does not give rise to a real temperature peak, but, corresponding to a variation in the pressure in one of the water supply pipes, it modifies the temperature of the mixed water that is drawn without in succession correcting this variation (as would a thermostatic mixing device). The use of one or two flow rate regulators, as described in relation to a thermostatic mixing device, makes it possible advantageously to moderate the temperature variation of the water that is drawn subsequent to a variation in the pressure in one of the water supply pipes.

A new use of a flow rate regulating device is disclosed, whose feature consists of the fact that, when inserted in a water pipeline, it permits the passage of a flow of water having a substantially constant flow rate and predetermined in keeping with the variation within certain limits of the pressure at which the water is supplied to the device, thus constituting a variable resistance that is opposed to the water flow, a use designed especially to perform the function of reducing the temperature peak presented by the mixed water drawn from a thermostatic mixing device during the transitory period of regulation when the pressure of the water supplied to one of the inlets of the thermostatic mixing device varies abruptly with respect to the pressure of the water supplied to the other inlet of the thermostatic mixing device, said use consisting of the insertion of said flow rate regulating device in the passage of at least one of the flows of supply of cold water and hot water directed to the thermostatic mixing device. The flow rate regulator can be inserted on the passage of both supply flows of cold and hot water, of the hot water supply flow only, or, and preferably, of the cold water supply flow only.

It must be understood that the invention is not confined to the embodiments described and illustrated by way of example. Several modifications are within the reach of the expert in the field, for example, the installed flow rate regulator can be of a type different from the one considered by way of example as long as it has similar features; the thermostatic mixing device or even the nonthermostatic mixing device can be of a type that does or does not act as a faucet and can be of any known type or of a special type involved in thermostatic mixing devices; if the flow rate regulator is installed in only one of the water supply connections, the other connection can be given a fixed choking member or it can be devoid of such a member; if the presence of a nonreturn valve is required, it can be installed in one or both of the water supply pipes, regardless of whether it is incorporated in a flow rate regulator or whether it constitutes a member by itself.

These and other modifications and any substitution with technical equivalents can be introduced in the subject matter described and illustrated above without departing from the scope and spirit of the present invention as defined by the appended claims.

What is claimed is:

1. A hydraulic installation, comprising:
   a thermostatic mixing device having an inlet connection (2) for receiving a flow of cold water through a cold water passageway, an inlet connection (3) for receiving a flow of hot water through a hot water passageway, and a delivery connection (4) for delivering mixed water; and
   a first flow rate regulating device (5) inserted in the cold water passageway,
   a second flow rate regulating device (6) inserted in the hot water passageway, wherein the first flow rate regulating device offers a greater resistance to the water flow than the second flow regulating device, and wherein the first flow rate regulating device (5) is adapted to limit the passage of a flow of water to a predetermined and substantially constant flow rate, thus reducing the temperature peak presented by the mixed water drawn from said mixing device when the pressure of the water supplied to one of said inlet connections (2, 3) varies abruptly with respect to the pressure of the water supplied to the other inlet connection (3, 2).

2. The hydraulic installation according to claim 1, wherein the first flow regulating device is of a simple type, devoid of any non-return means.

3. The hydraulic installation according to claim 2, wherein the first flow rate regulating device (5) of the simple type is inserted in said inlet connection (2) for receiving the flow of supply of cold water.

4. The hydraulic installation according to claim 2, wherein the second flow regulating device is linked to a non-return means.

5. The hydraulic installation according to claim 4, wherein the second flow rate regulating device (6) of the type linked to a non-return means (7) is inserted in said inlet connection (3) for receiving the flow of supply of hot water.

6. The hydraulic installation according to claim 1, further comprising means for restricting the pressure of the water supplied to the first and second flow rate regulating devices to within a range from 1 to 10 bar of pressure.

* * * * *